J. W. WINZELER.
COT.
APPLICATION FILED SEPT. 14, 1916.

1,316,662.

Patented Sept. 23, 1919.
3 SHEETS—SHEET 1.

Inventor
John W. Winzeler
by LaPorte & Bean
Attorneys.

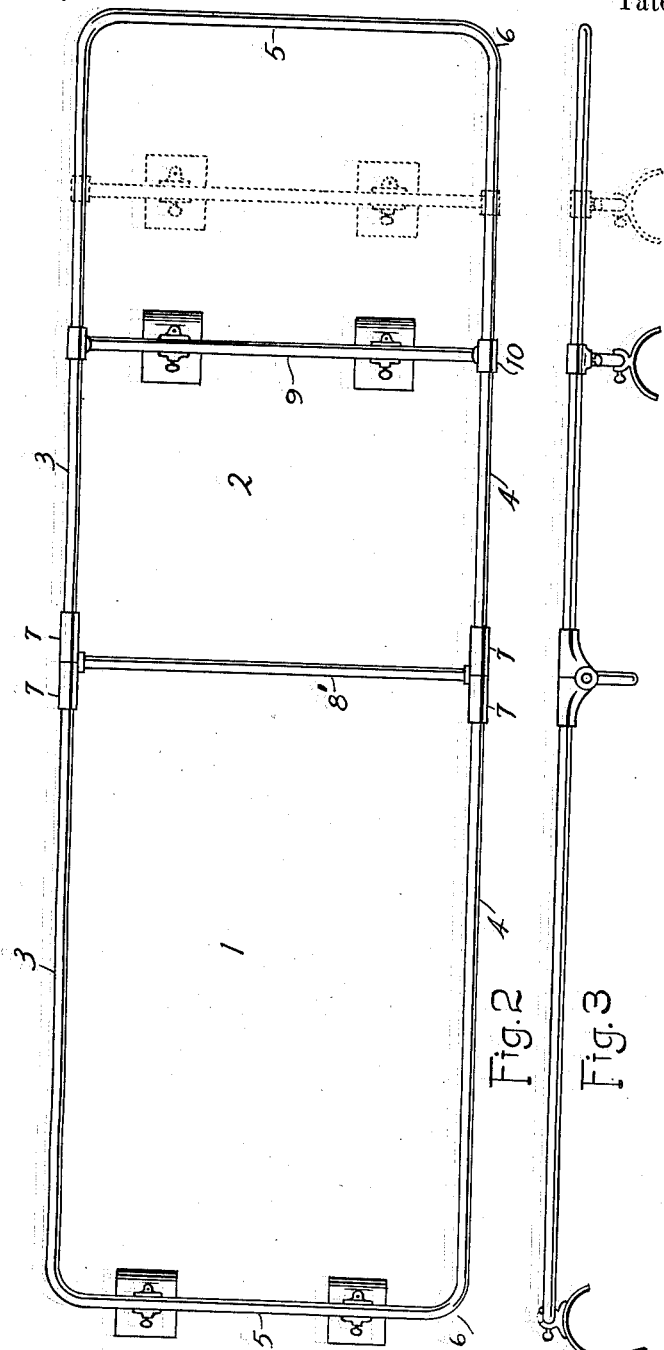

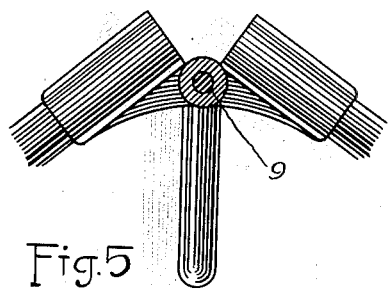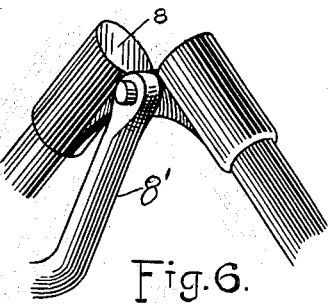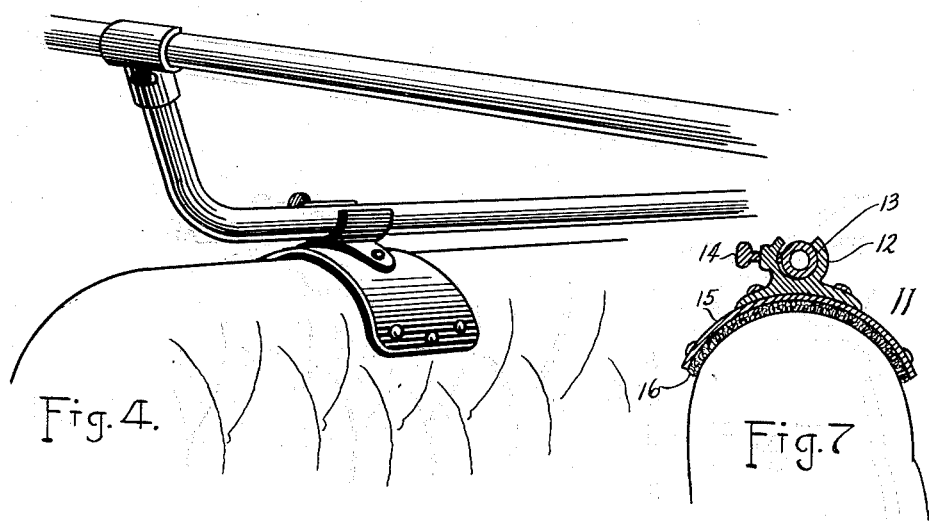

UNITED STATES PATENT OFFICE.

JOHN W. WINZELER, OF PEORIA, ILLINOIS.

COT.

1,316,662.

Specification of Letters Patent. Patented Sept. 23, 1919.

Application filed September 14, 1916. Serial No. 120,060.

*To all whom it may concern:*

Be it known that I, JOHN W. WINZELER, a citizen of the United States, a resident of Peoria, in the county of Peoria and State of Illinois, have invented new and useful Improvements in Cots, of which the following is a specification.

This invention has reference to cots.

The object of the invention is to provide a cot designed particularly for use in connection with automobiles and intended to be used as an ambulance cot for carrying invalids and people who are sick or infirm. The cot, however, may be used for a great many other purposes, viz: for sleeping purposes, for camping out purposes, or to be used by undertakers for carrying bodies or caskets, as the case may be.

The invention has for a further object, to provide a cot for use in automobiles, including supporting means for the cot on the backs of the seats of the automobile, the same being adjustable to adapt the cot to automobiles of different lengths and for different spacing between the backs of the seats of the automobile.

A further object of the invention is to provide a cot for automobiles which may be folded in a compact form for storage or shipping purposes, and which is provided with supporting means for supporting the cot on the front and rear seats of the automobile, said supporting means being adjustable to support the cot in different automobiles where there is a difference in the spacing between the front and rear seats, and also adapted to fit different width seats in different automobiles.

In the drawings,

Fig. 2 is a plan view showing the frame of the cot in open position and in dotted lines, the support which rests on the front seat shown in adjusted position;

Fig. 3 is an edge elevation of Fig. 2;

Fig. 4 is a perspective view showing one of the side rails of the cot, the adjustable cross brace and one of the clamps forming a rest for the cot on the front seat;

Fig. 5 is a detail in elevation showing the hinge members for the side rails of the cot;

Fig. 6 is a perspective view of the hinge member shown in Fig. 5, and

Fig. 7 is a detail sectional view showing the construction of the clamps which rest on either the front or rear seats of the automobile.

Like characters of reference indicate corresponding parts throughout the figures.

Figure 1:
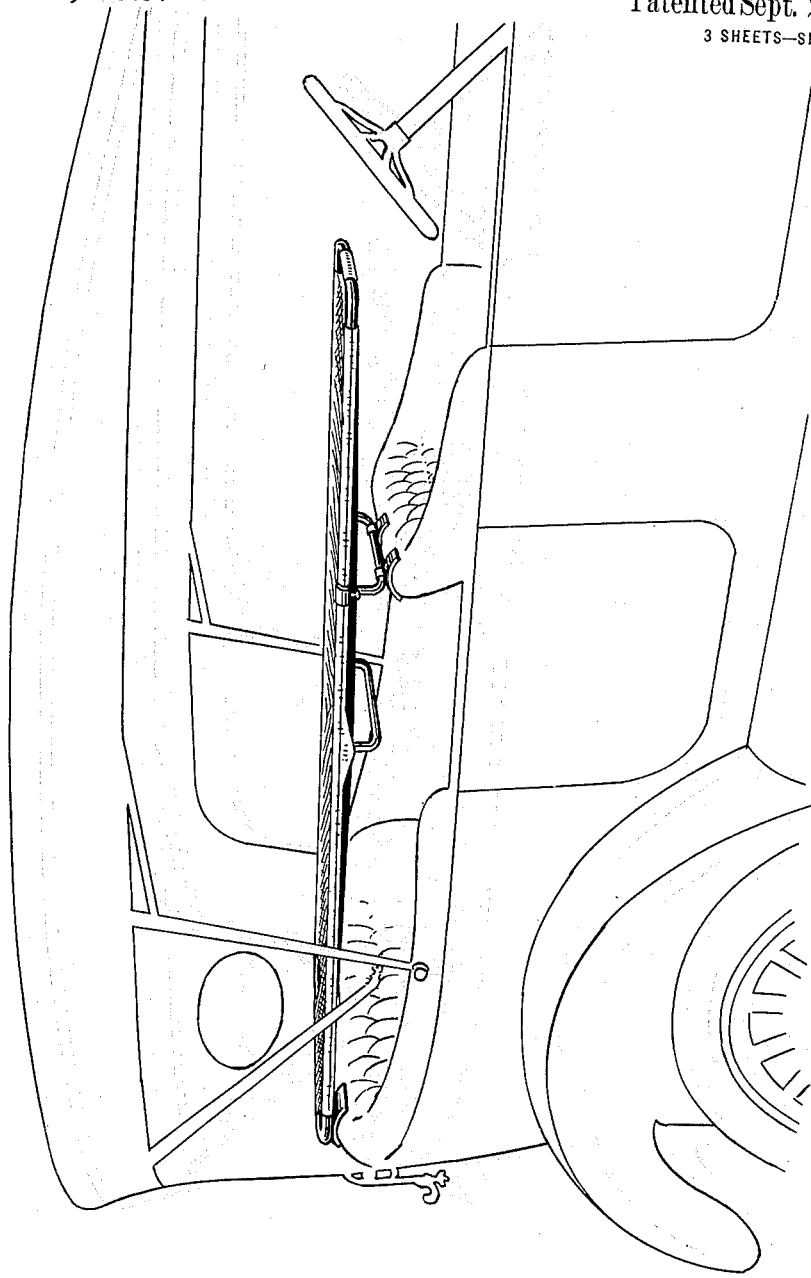
Figure 1 is a perspective view of an automobile showing my improved cot and the manner of resting the same upon the front and rear seats of the machine.

In Fig. 1, I have shown my improved cot and the manner of resting the same on the front and rear seats of the automobile, the cot shown complete with the canvas attached thereto.

I make no claim in this application on the canvas portion of the cot or the manner of attaching said canvas to the side and end rails of the cot, except that it is preferable to attach the canvas to the rails of the cot in a manner which will leave the corners of the cot exposed, as shown in Fig. 1, to provide hand-holds or gripping portions for persons to catch hold when placing the cot in an automobile or removing it therefrom.

The cot frame is preferably made in two sections, 1 and 2, the same being connected by hinge joints, whereby one section may be folded on to the other, to make a compact bundle of the frame for storage and shipping purposes. The sections 1 and 2 are formed with the side rails 3 and 4 and the end rails 5. The side and end rails of each section of the cot are preferably made of tubing, and the end rails 5 are formed by bending the side rails as at 6. The inner or matching ends of the side rails 3 and 4 are each connected to members 7 which have abutting ends 8 and which are hinged together at 9, so that the sections 1 and 2 of the cot may be folded one upon the other. The connection of the side rails 3 and 4 with the hinge member 7 may be made by threading the ends of the rails 3 and 4 and screwing the same into the hinge member 7 or by welding or otherwise suitably connecting said side rails to said hinge members.

8' designates a cross brace which is preferably located at the hinge of the cot and extends cross-wise of the cot frame, said brace being preferably of a U-shape and connected with the pintle which forms the hinge for the members 7. The object of making the cross brace 8' of U-formation is that it is hung low enough so as to avoid the body of a person resting upon the canvas of the cot, engaging or coming into contact therewith, caused by the stretching of the canvas. By placing the brace 8' coincident with the hinge, when the sections 1 and 2 are folded upon themselves, this brace may be turned to lie flat with the package and be out of the way.

9 designates an additional brace extending crosswise of the cot and connected to the side rails 3 and 4 thereof, preferably to the side rails of section 2 of the cot, this being the section which overlies and is supported upon the back of the front seat of an automobile, when the cot is put in the machine.

This brace 9 is also of U-formation and its ends are connected with couplings 10 which have the functions of sleeves so that they may slide on the side rails 3 and 4 of the cot, as shown in the full lines and dotted line positions in Figs. 2 and 3 of the drawing. The purpose of adjusting the brace 9 on the side rails of the cot is to adapt the cot to the differences in spacing between the front and rear seats of different automobiles.

Adjustably clamped on the adjustable brace 9, and the end rail 5 of the section 1 of the cot, are rests 11. These rests are in all respects similar to each other and the description of one will suffice for all.

It is understood that two or more rests are clamped to the brace 9 and to the end rail 5 and are so clamped to these parts that they may be adjusted toward and from each other and the side rails 3 and 4 of the cot to adapt the cot to different width seats of different automobiles, and said rests are so clamped to these parts that they may be swung on the other parts to be out of the way when the cot is folded in a compact form.

The reason for attching the rests 11 in the one instance to a brace of the character shown by the reference numeral 9 and in the other instance to the end rail 5, is that the back of the front seat is usually lower than the back of the rear seat of an automobile and in this manner the cot may be supported in an approximately level position in the car.

By reference to Figs. 4 and 7, a detail of the rest for the cot on the front and rear seats may be seen. The rest comprises a clamp member 12 formed with a socket 13 adapted to receive the rail or brace of the cot and 14 is a thumb nut for locking the rest in position on the rail or brace of the cot. To the clamping member 12 is connected the member 15 which is curved longitudinally in cross-section to adapt it to fit over the seat of the automobile, and to protect the seat I preferably attach to the member 15, a lining 16 of any suitable material which will protect the seat of the automobile when the cot is resting thereon, as shown in Fig. 1.

It is obvious from the foregoing description, that the cot may be made any width to take up all of the space in the automobile, but preferably the cot is made of only sufficient width to receive one person and when used for ambulance or similar purposes, after the cot has been placed in the automobile, sufficient room is left for the driver of the automobile and an attendant for the person on the cot. It is further obvious that the cot is not only useful for ambulance purposes by physicians or other persons, but may be used by undertakers or by parties desiring to use the same for camping out purposes when traveling from place to place through the country.

What I claim is:—

1. In a cot, in combination, a plurality of frame sections, means for hinging the sections together that they may be folded into compact form, means connected with one section of the frame for resting the same on the rear seat of a vehicle, and means connected with the other section of the frame for resting the same on the front seat of a vehicle, said last mentioned means adjustable longitudinally of the frame to adapt the cot to vehicles where the front and rear seats are spaced different distances apart.

2. In a cot, in combination, a plurality of frame sections, each section including side and end rails, means for hinging the matching ends of the side rails of the two sections together that the sections may be folded into compact form, means connected with the end rail of one section of the frame for resting the same on the rear seat of a vehicle, and means connected with the side rails of the other section of the frame for resting the same on the front seat of a vehicle, said last mentioned means adjustable longitudinally on said side rails to adapt the cot to vehicles where the front and rear seats are spaced different distances apart.

3. In a cot, in combination, a plurality of frame sections, means for hinging the sections together that they may be folded into compact form, a brace for the said sections extending cross-wise of the cot coincident with the hinges of said sections, means connected with one section of the frame for resting the same on the rear seat of a vehicle, and means connected with the other section of the frame for resting the same on the front seat of a vehicle, said last mentioned means adjustable longitudinally of the frame to adapt the cot to vehicles where the front and rear seats are spaced different distances apart.

4. In a cot, in combination, a plurality of frame sections, means for hinging the sections together that they may be folded into compact form, means connected with the end of one section of the frame for resting the same on the rear seat of a vehicle, said means being adjustable laterally of the frame to adapt the same to different width seats, and means connected with the other section of the frame for resting the same on the front seat of a vehicle, said last mentioned means adjustable longitudinally of the frame to adapt the cot to vehicles where the front and rear seats are spaced different distances apart, and also adjustable laterally of the frame to adapt the same to different width seats.

5. In a cot, in combination, a frame including side and end rails, means connected with one end rail of said frame for supporting the same on the rear seat of a vehicle, and means connecting the side rails of the frame for supporting the opposite end of the frame on the front seat of a vehicle, said last mentioned supporting means adjustable longitudinally of the frame to adapt the cot to vehicles where the front and rear seats are spaced different distances apart.

6. In a cot, in combination, a frame including side and end rails, means connected with one end rail of said frame for supporting the same on the rear seat of a vehicle, a frame member connecting the side rails at the opposite end of the frame, and means on said frame member for supporting the frame on the front seat of a vehicle, said frame member lying below the plane of the side rails of the frame so as to support the frame in the vehicle in a substantially horizontal position.

7. In a cot, in combination, a frame including side and end rails, means connected with one end rail of said frame for supporting the same on the rear seat of a vehicle, said supporting means being adjustable on said end rail to adapt the frame to different width seats, a frame member connecting the side rails at the opposite end of the frame and adjustable longitudinally on said side rails to adapt the cot to vehicles where the front and rear seats are spaced different distances apart, means connected with said frame member for supporting the corresponding end of the cot on the front seat of a vehicle, said supporting means being adjustable on said frame member to adapt the frame to different width seats.

8. In a cot, in combination, a plurality of frame sections, each section including side and end rails, means for hinging the meeting ends of the side rails of the opposite sections to each other that the cot may be folded into compact form, a transverse brace member for said frame connected with the pivots of the hinges, members connected with the end rail of one section for supporting that end of the cot on the rear seat of a vehicle, a transverse member adjustably connected with the opposite rail sections of the other frame section, and members connected with said transverse member for supporting that end of the cot on the front seat of a vehicle.

9. In a cot, in combination, a frame including side and end rails, clamps adjustably connected with one of said end rails, rests for the cot connected with said clamps and shaped to conform to the backs of the seats of vehicles on which they are supported, a brace member connecting the side rails of said frame and adjustable longitudinally thereof, clamps adjustably connected with said brace member, rests for the cot connected with said clamps and adapted to conform to the backs of the seats of vehicles on which they are supported.

10. In a cot, in combination, with the frame thereof, of a plurality of rests for supporting the frame on the seats of the vehicle, said rests including clamps, means for adjustably connecting said clamps to the frame of the cot, members connected with said clamps and shaped to conform to the backs of the seats on which the cot is supported, and linings for said members.

JOHN W. WINZELER.